(12) United States Patent
Griffis et al.

(10) Patent No.: US 10,805,533 B2
(45) Date of Patent: Oct. 13, 2020

(54) WIDE AREA IMAGING SYSTEM AND METHOD

(71) Applicant: Diversified Innovations Fund, LLLP, Scottsdale, AZ (US)

(72) Inventors: Andrew J. Griffis, Tucson, AZ (US); Michael B. Powell, Tucson, AZ (US); Mark J. Howell, Tucson, AZ (US)

(73) Assignee: Diversified Innovations Fund, LLLP, Scottsdale, AZ (US)

( * ) Notice: Subject to any disclaimer, the term of this patent is extended or adjusted under 35 U.S.C. 154(b) by 0 days.

(21) Appl. No.: 16/179,459

(22) Filed: Nov. 2, 2018

(65) Prior Publication Data

US 2019/0174059 A1    Jun. 6, 2019

Related U.S. Application Data

(63) Continuation of application No. 15/794,681, filed on Oct. 26, 2017, now Pat. No. 10,122,920, which is a continuation of application No. 14/070,934, filed on Nov. 4, 2013, now Pat. No. 9,813,618.

(60) Provisional application No. 61/722,120, filed on Nov. 2, 2012.

(51) Int. Cl.
*H04N 5/232* (2006.01)
*H04N 5/225* (2006.01)
*H04N 5/33* (2006.01)

(52) U.S. Cl.
CPC ....... *H04N 5/23238* (2013.01); *H04N 5/2259* (2013.01); *H04N 5/332* (2013.01)

(58) Field of Classification Search
CPC ... H04N 5/23238; H04N 5/332; H04N 5/2259
See application file for complete search history.

(56) References Cited

U.S. PATENT DOCUMENTS

| | | | |
|---|---|---|---|
| 4,568,160 A | 2/1986 | Krueger | |
| 5,872,594 A | 2/1999 | Thompson | |
| 6,976,032 B1 | 12/2005 | Hull et al. | |
| 7,768,552 B1* | 8/2010 | Doron | H04N 1/2112 348/220.1 |
| 9,876,993 B2 | 1/2018 | Sablak et al. | |
| 2002/0041328 A1 | 4/2002 | LeCompte et al. | |
| 2002/0085273 A1 | 7/2002 | Ito | |

(Continued)

OTHER PUBLICATIONS

Stauffer C, Grimson W. E. L. Adaptive background mixture models for real-time tracking. In Proceedings. 1999 IEEE Computer Society Conference on Computer Vision and Pattern Recognition (Cat. No. PR00149). IEEE Comput. Soc. Part vol. 2, 1999.

*Primary Examiner* — Tracy Y. Li
(74) *Attorney, Agent, or Firm* — Panitch Schwarze Belisario & Nadel LLP

(57) ABSTRACT

The present invention provides a new and useful paradigm in wide area imaging, in which wide area imaging is provided by a step/dwell/image capture process and system to capture images and produce from the captured images a wide area image. The image capture is by a sensor that has a predetermined image field and provides image capture at a predetermined frame capture rate, and by a motorized step and dwell sequence of the sensor, where image capture is during a dwell, and the step and dwell sequence of the sensor is synchronized with the image capture rate of the sensor.

17 Claims, 7 Drawing Sheets

(56) References Cited

U.S. PATENT DOCUMENTS

| | | |
|---|---|---|
| 2004/0228544 A1* | 11/2004 | Endo ................ G06T 3/4038 |
| | | 382/284 |
| 2005/0190276 A1 | 9/2005 | Taguchi |
| 2008/0260369 A1 | 10/2008 | Ibaraki |
| 2010/0176918 A1 | 7/2010 | Turner et al. |
| 2012/0176492 A1 | 7/2012 | Garin |
| 2013/0070091 A1* | 3/2013 | Mojaver ............... G02B 26/10 |
| | | 348/143 |
| 2013/0188010 A1* | 7/2013 | Dortch .............. H04N 5/23238 |
| | | 348/37 |
| 2014/0226003 A1 | 8/2014 | Phaneuf et al. |

* cited by examiner

Figure 1. Example Simplified System Architecture
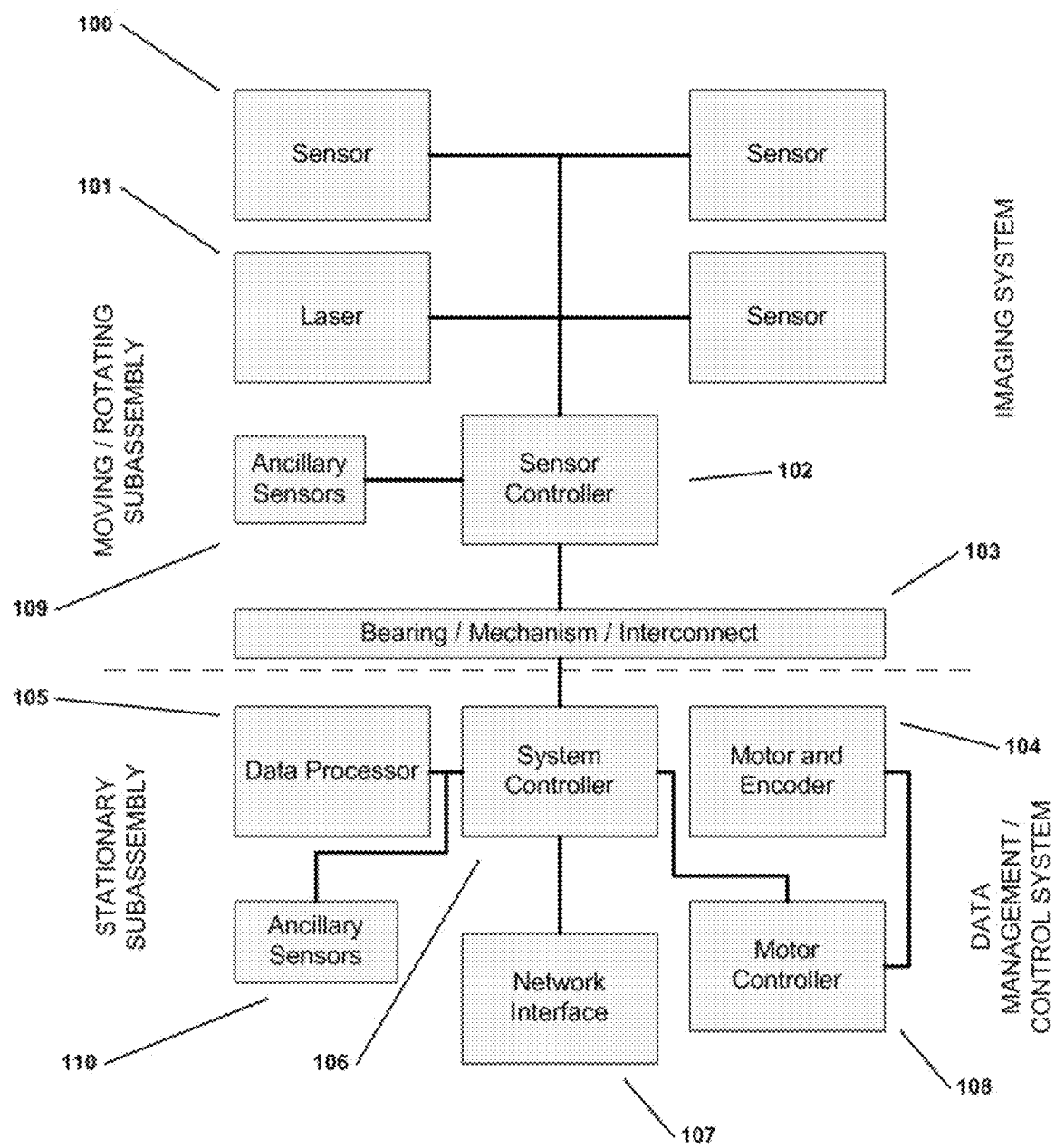

Figure 2. Example System Geometry
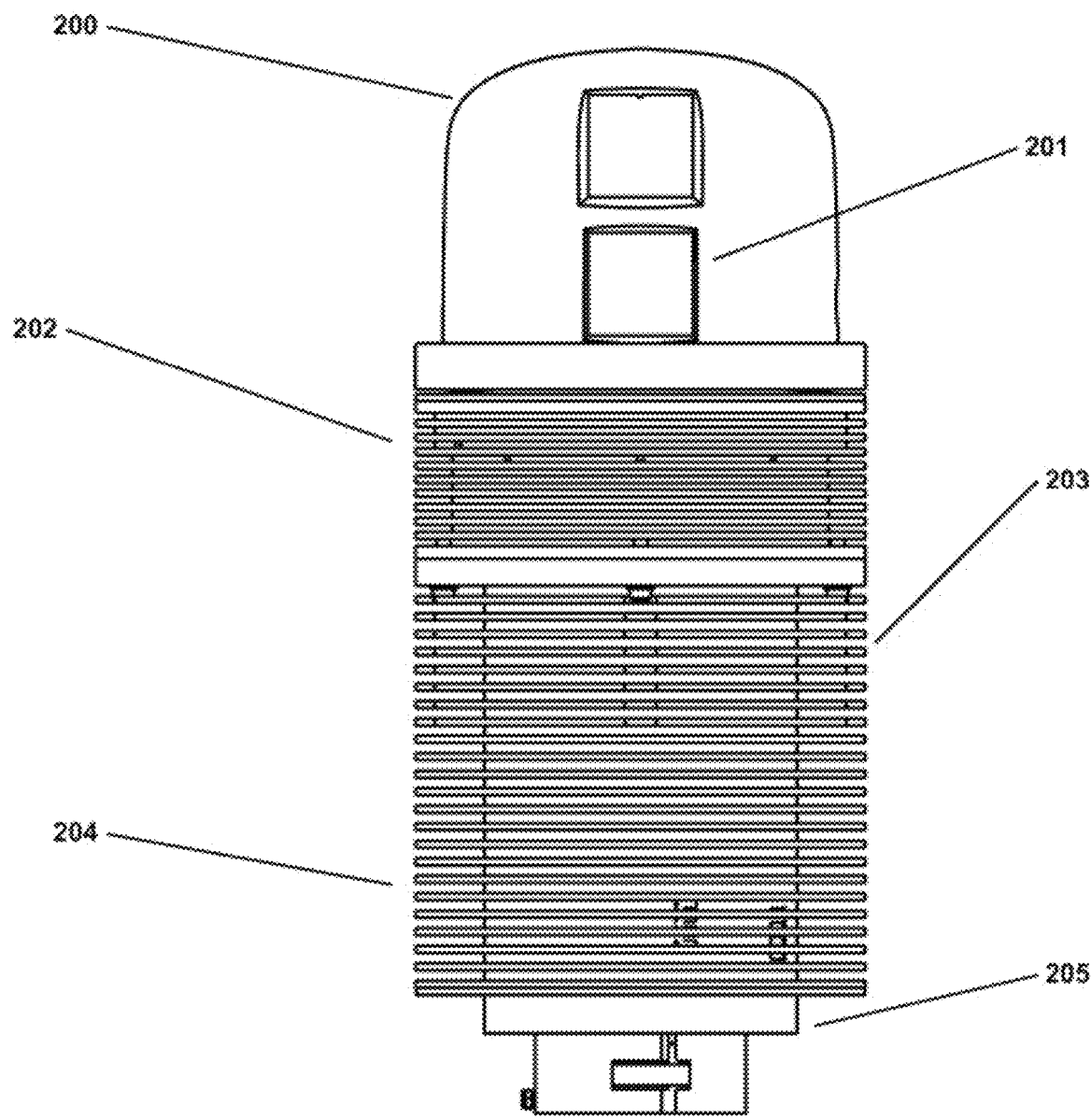

Figure 3. Example System Geometry: Upper Section
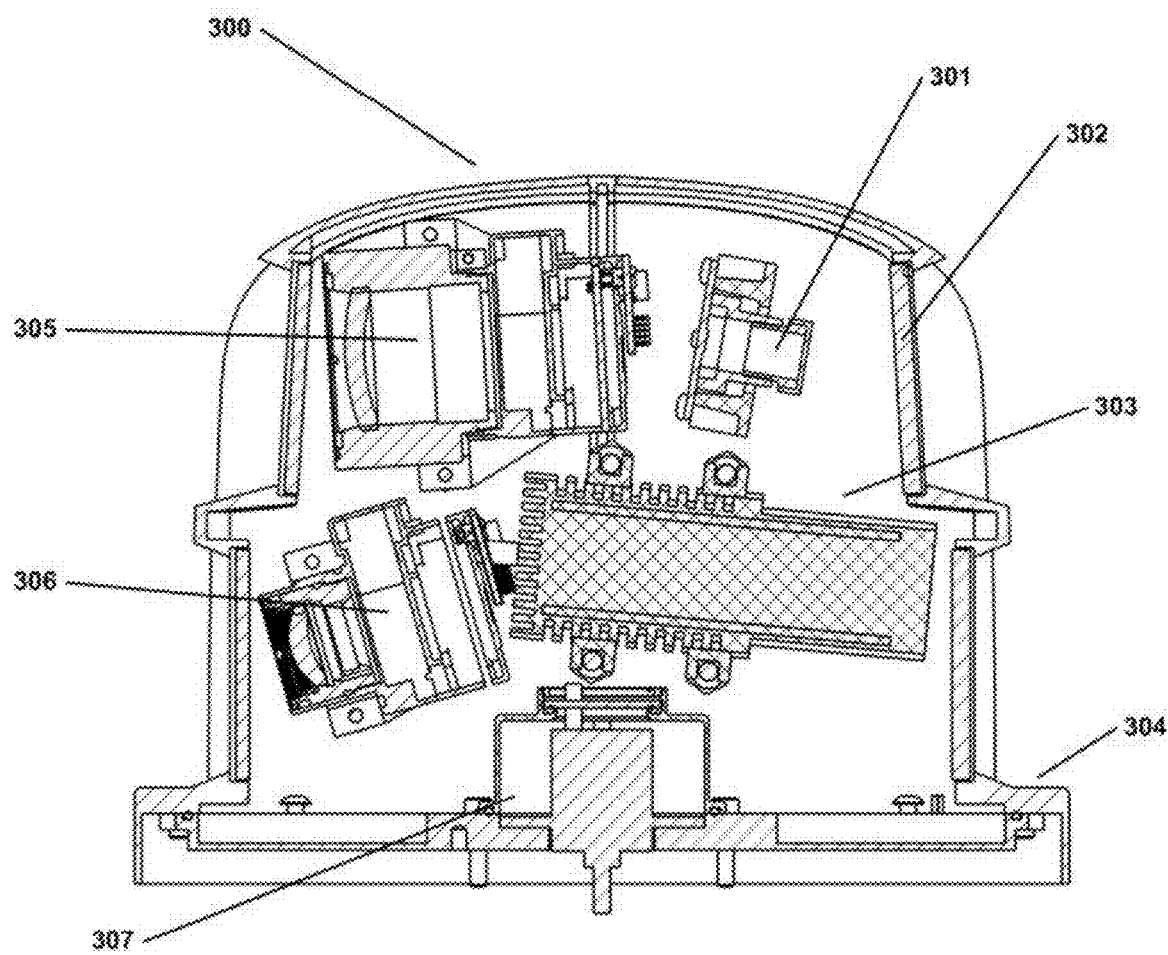

Figure 4. Example System Installation
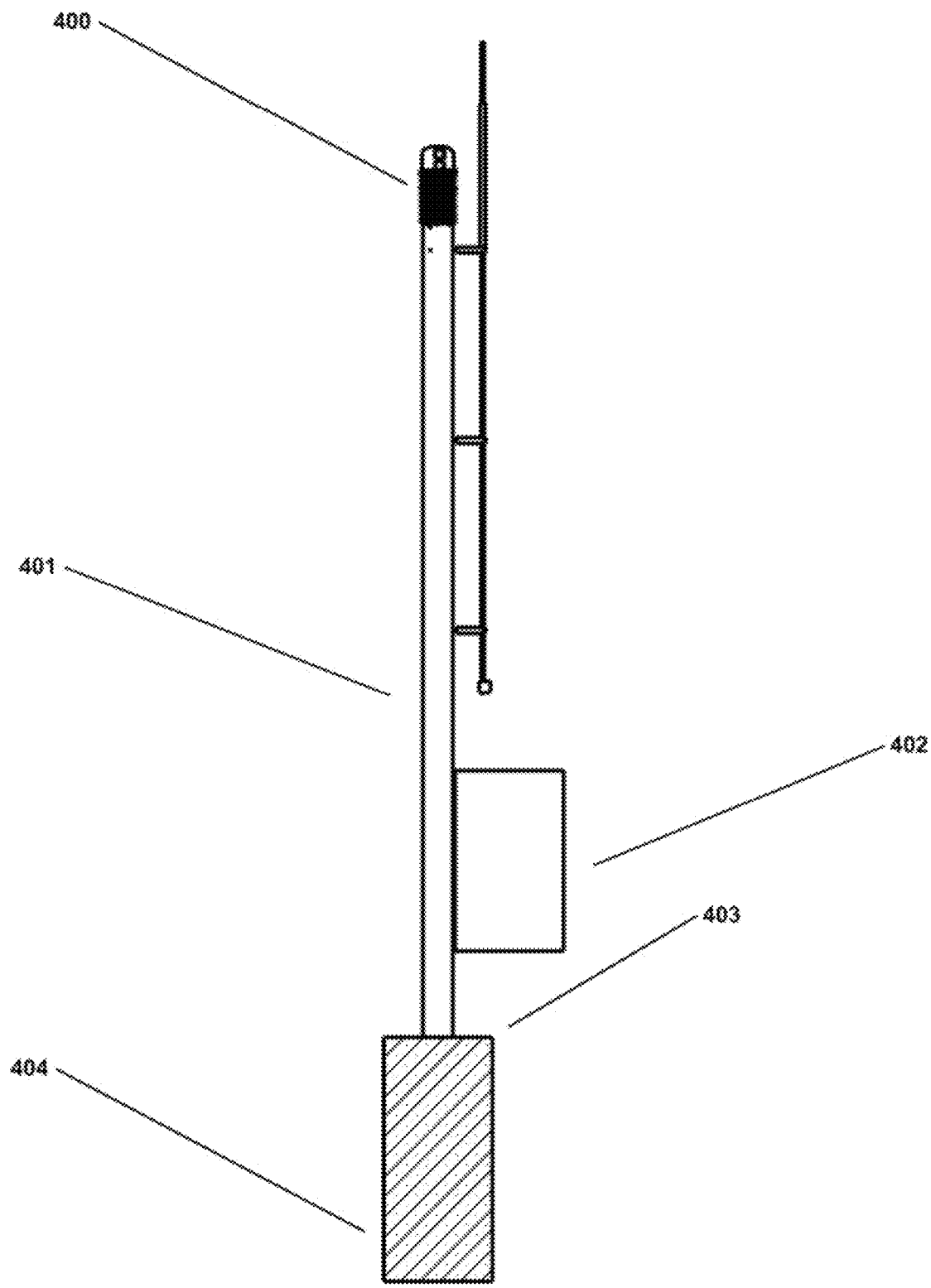

Figure 5. Imaging and motion timing example
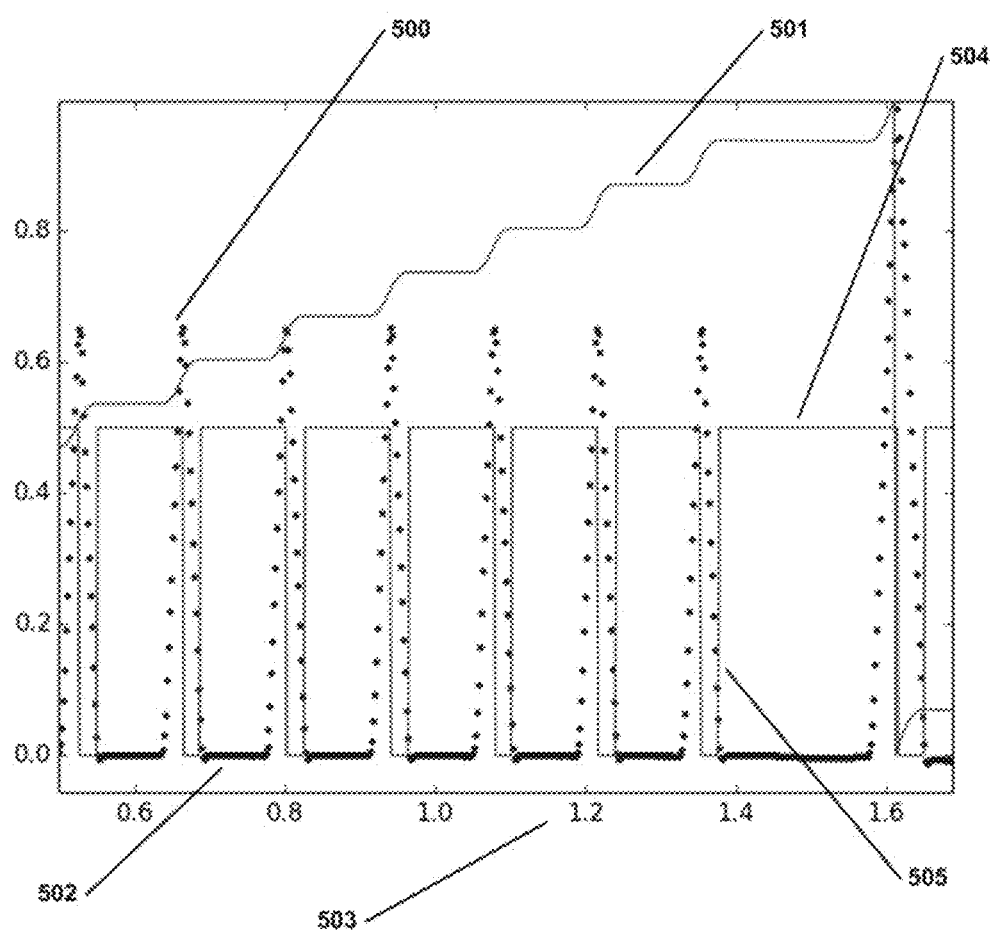

Figure 6. Sensor, lens, FPA assembly example
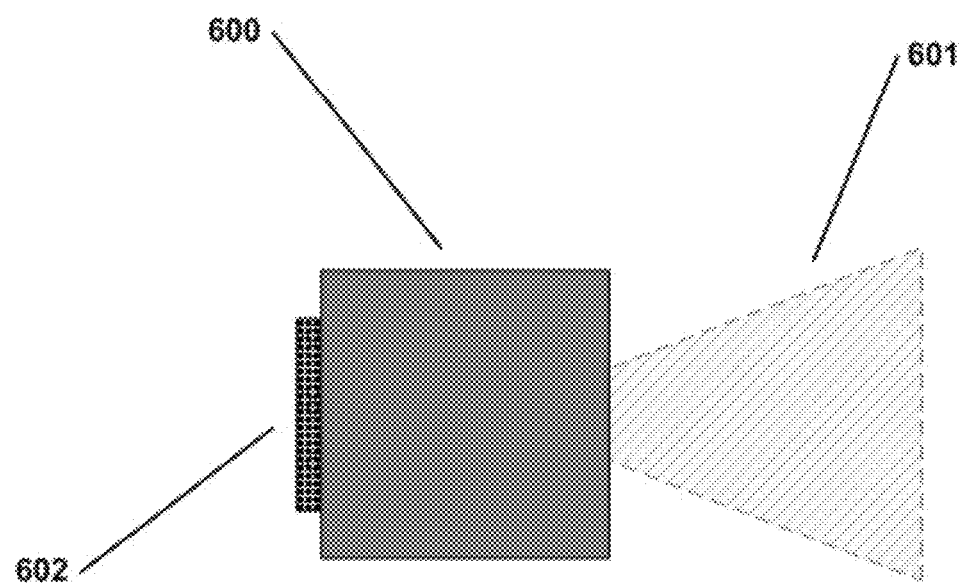

Figure 7. Sensor field of view and panorama formation example
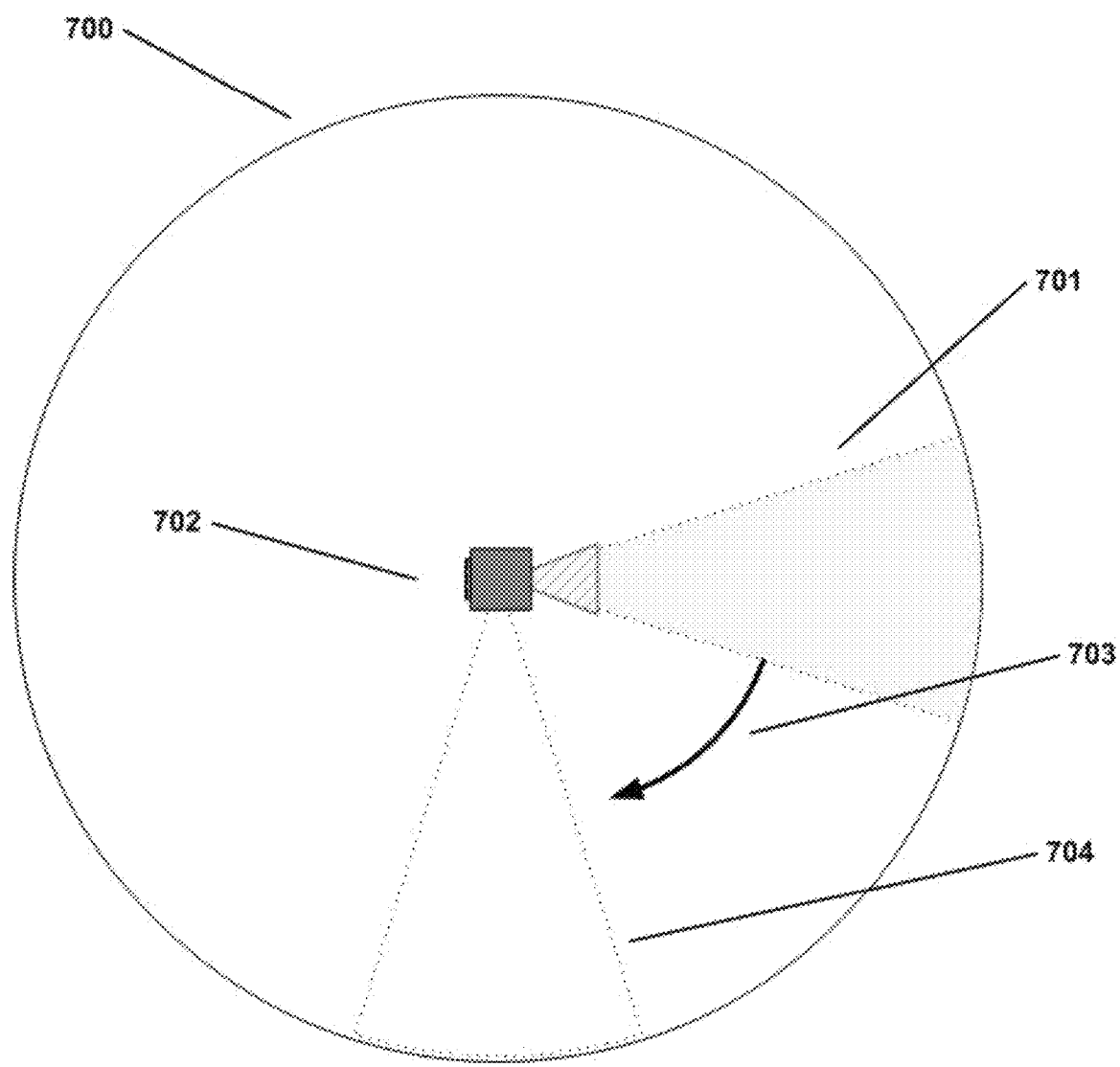

WIDE AREA IMAGING SYSTEM AND METHOD

RELATED APPLICATION/CLAIM OF PRIORITY

This application is a continuation of copending U.S. application Ser. No. 15/794,681 filed Oct. 26, 2017, which is incorporated by reference herein, and which, in turn, is a continuation of U.S. application Ser. No. 14/070,934 filed Nov. 4, 2013, now U.S. Pat. No. 9,813,618, which is also incorporated by reference herein, and which claims the priority of Provisional Application No. 61/722,120, filed Nov. 2, 2012, which is also incorporated by reference herein.

BACKGROUND

The invention relates to the field of wide area, or, when imaged regions are all contiguous, panoramic imaging. The invention has particular utility for commercial security and surveillance but is readily used for other applications that require a low cost wide field of view device, particularly mid-wave and long-wave thermal infrared (MWIR, LWIR respectively).

There are at least three ways to obtain a wide area image, including a 360 degree panorama, with a focal plane array (FPA): 1) use multiple copies of the FPA each having its own lens and field of view, and assign each of the FPAs to a particular segment of the wide area; 2) use projection optics to map pixels around the periphery to a common FPA, typically imaging the periphery onto an annulus within the FPA; 3) move or scan the FPA and lens so as to use a limited field of view device (i.e., <360 degrees) to collect images in sequence that, when viewed together completely image the wide area, or in the case of a 360 degree panorama, comprise a 360 degree field of view.

The choice of one method over another is often driven by the tradeoff between cost, frame rate (images per second) and sensitivity (amount of energy needed for a good image). Presently, reliable and relatively low cost MWIR and LWIR FPAs, e.g., uncooled microbolometers, are readily available. These are sometimes used in scenario (1) above, but require many FPA's, thereby making this scenario costly and less reliable for commercial applications. When these devices are used for scenario (3), they are inefficient in the use of pixels and also require an expensive peripheral window, both of which push cost upwards. The use of uncooled microbolometer FPAs continuously scanning a wide area can provide a low cost means of imaging, but the imaging speed is too low for real-time applications, owing to the low sensitivity, e.g., $D^*$, of such thermal devices (as compared to cooled photonic devices) and the typically low sampling rate required by pixel thermal mass constraints. Thus even with a relatively low cost technology (uncooled microbolometers) it is yet relatively expensive to obtain a 360 degree field of view.

Thus it is typical to use a relatively expensive sensor technology, e.g., cooled HgCdTe or something comparable, but use only a minimal size FPA, e.g., a few columns and a few hundred rows, so as to minimize the amount of expensive detector material and yet afford the opportunity to generate many resultant image pixels by using a simple, low cost mechanism—a continuous scan, constant velocity rotary mechanism. Typically, the hundreds of rows are used to image the vertical dimension and the few columns are used to capture the horizontal, rotating, dimension and many columns are joined ("stitched") together. Furthermore, TDI (time delay and integration) techniques can be used to integrate many "looks" per column together so as to accumulate signal and overcome any shortfall in sensitivity, even while mitigating the effects of motion induced blur.

The resultant wide area imaging system can be very effective, but even with a good tradeoff in the choice of sensor technology and the number of pixels used, the overall solution has a relatively low mean time to failure which makes it expensive to maintain and the systems components are quite expensive, often much more expensive than the aforementioned multiple-FPA approach for uncooled microbolometers devices.

The objective of the invention then, is to produce a time series of wide area images, i.e., having a field of view greater than that of the sensor by itself, so that object detection and related data reduction activities ensue. A traditional panorama involves a set of adjacent images that have some overlap that permits edges to be merged seamlessly into a single composite image. Such a panorama is within the capability of the invention, but only sometimes generated by the invention. This is due to the desire to minimize time spent on image areas that have little interest, leaving more time (and therefore higher rates of imaging or coverage) for image areas that have elevated interest. For instance, in a perimeter surveillance scenario where a fence line is to be monitored, the area adjacent to, but outside, the fence, is typically of more interest than areas inside the fence, so an imaging system would provide higher performance for detecting activity outside the fence if more time could be spent imaging those regions. This desire for a high degree of flexibility and control in the distribution of the imagery generated leads to a requirement for computer control of both timing of sensor imaging and the motion profile. Because the motion of the sensor is under computer control, e.g., a direct drive servo motor driven by a real time motor controller with encoder feedback, in the preferred embodiment, the sensor motion profile can be arbitrarily determined—there is no pattern that cannot be commanded and generated on demand, adaptively when needed, within the range of velocities and positions enabled by specific choices of motor, amplifier, encoder and mass/inertia of the sensor assembly. The preferred embodiment uses a direct drive servo for the precision control it provides, but also for the longevity, consistency and reliability provided by the absence of gears, pulleys or otherwise friction-based mechanical assemblies. Such assemblies can be made to work with the invention, but will not be as broadly optimal as the direct drive servo motor implementation.

SUMMARY OF THE PRESENT INVENTION

The present invention provides a new and useful paradigm in wide area imaging, which overcomes the types of issues discussed above.

According to the present invention, wide area imaging, including panoramic imaging, is provided by a step/dwell/image capture process/system to capture images and produce from the captured images a wide area image. The image capture is by a sensor that has a predetermined image field and provides image capture at a predetermined frame capture rate, and by a processor controlled motorized step and dwell sequence of the sensor, where image capture is during a dwell, and the step and dwell sequence of the sensor is synchronized with the image capture rate of the sensor.

In a preferred form of the system and method of the present invention, the step/dwell/image capture sequence is under processor control that is interfaced to a servo motor to selectively control the sensor position in a manner that is related to the step/dwell/image capture sequence.

For this reason, the term, step, represents a variable move: the size of the step, speed of the step and timing of the step are completely within the ability of the controlling processor to specify upon demand, at any time. Thus a step is not a fixed quantity for the invention; it is a movement under control of a processor and associated electronic motor controller (e.g., FIG. 1).

In addition, in a preferred aspect of the present invention, the sensor is located on a moveable platform, and movements of the platform that affect the wide area image produced from the captured image are measured and used to provide image compensation that is related to such movements of the platform. Moreover, when a subject, e.g. a human, is identified in the wide area image, the subject can be hailed or notified that its presence has been detected.

The preferred wide area imaging system and method can also have one or more of the following features;

a. The wide area system and method may include a processor that uses motion and/or object detection on a captured image or the wide area image to extract and localize objects of interest in the wide area image.

b. The wide area system and method may be configured to provide variable step and dwell sequences of the sensor, to produce the wide area image using a processor, without modifying the movable platform mechanism.

c. The wide area system and method may be configured to provide variable step and dwell sequences of the sensor, to enable the sensor to localize the sensor on selected image fields. Thus, if the system is being manually or automatically monitored, and the monitor observes an object of particular interest, the sensor can be localized on that object.

d. The wide area system and method can have (or be controlled by) a processor configured to use measures of object detection or recognition or identification, probability, e.g., successive hypothesis testing, of detected objects in the wide area image to determine the step and dwell sequences of the sensor.

e. In the wide area system and method the sensor can be configured to produce image capture in a manner that is useful in producing high density imagery, e.g., images having on the order of a million pixels or more, from or as the wide area image.

f. The wide area system and method can be coupled to a control center (a location separate from the location of the invention from which a person could control and observe the invention operation) via an interface and configured to allow the control center access to subsets of the captured images, via the interface.

g. The wide area system and method can have a sensor configured with one of the following sensing techniques: infrared, visible or other wavelengths to form an image using sensor pixels, including the collection of multiple wavelength images at the same time (multiple FPAs).

h. The step/dwell/image capture sequence can be configured to synchronize the initiation of image capture by the sensor to a position to which the sensor is selectively moved under servo motor control.

i. the step/dwell/image capture sequence can be configured to synchronize movement of the sensor to a selected position to the timing with which the sensor is controlled to initiate image capture.

It should also be noted that the present invention overcomes the difficulties described above by using a low cost sensor with sufficient pixels for the application but overcomes the limitations of sensitivity and speed by way of a digitally controlled servo system (that controls the motorized step and dwell sequence) that accommodates the need for variable or programmable integration times while providing motion adequate to form a wide area image quickly and continuously, and to selectively control or vary the wide area image in real time.

Additional features of the present invention will be apparent from the following detailed description and the accompanying drawings

BRIEF DESCRIPTION OF THE DRAWINGS

FIG. 1 shows the architecture of the invention that includes the imaging, actuation and data management subsystems while also indicating the network centric nature of the invention and its data products.

FIG. 2 illustrates an example geometry for the invention packaging, wherein the upper portion contains the imaging sensor and optics, ancillary sensor(s) (as needed), the middle section contains the motor, bearings, and support for power and data in the upper portion, while the lower portion contains the motion control, data processing, and ancillary sensor, e.g., inertial sensor, electronics with integral heat dissipation elements if needed;

FIG. 3 illustrates an example geometry for the invention packaging for the upper portion of FIG. 2, wherein the upper portion contains the imaging sensor and optics, ancillary sensor(s), e.g., inertial, and a hailing device e.g., a laser, along with the requisite surroundings including wavelength appropriate windows for optical elements;

FIG. 4 shows an example installation of the invention mounted atop a pole and connecting to site infrastructure through a cabinet at the base of the pole;

FIG. 5 shows an example of actuation and imaging timing where a step-dwell-step (etc) sequence is described to account for the sensor motion, sensor integration and readout of image data respectively;

FIG. 6 shows an example of a sensor packaged with a lens and identifying the FPA and associated FPA/lens field of view;

FIG. 7 shows an example of actuation and imaging timing where a step-dwell-step (etc) sequence is described to account for the sensor motion, sensor integration and readout of image data respectively;

DETAILED DESCRIPTION

As discussed above, the present invention relates to a new and useful paradigm in wide area imaging, including panoramic imaging, in which the wide area imaging is provided by a step/dwell/image capture, and as needed image stitch, process to capture images and produce from the captured images a wide area image. The image capture is by a sensor that has a predetermined image field and provides image capture at a predetermined frame capture rate, and by a motorized step and dwell sequence of the sensor, where image capture is during a dwell period or interval, and the step and dwell sequence of the sensor is synchronized with the image capture rate of the sensor. In addition, an image stitch is processor controlled and designed to combine images captured by the sensor in a predetermined manner to produce the wide area image.

The principles of the present invention are described herein in connection with one exemplary system and method, and from that description the manner in which the principles of the present invention can be applied to various types of wide area imaging systems and methods will be apparent to those in the art.

In this application, "panorama" or "panoramic imaging" means a scene that is taken in and produced by a step/dwell/ image capture/image sequence, and that scene may be a full 360 degree scene or less than a 360 degree scene, or any wide angle scene, so long as the scene is taken in and produced by a step/dwell/image capture sequence.

The system of the invention is comprised of two major subsystems (FIG. 1): sensors and sensor controllers (that are part of an imaging system); actuation, data and systems control (which are part of a data management and control system), which when used in conjunction with one another enable the low cost wide area imaging system and method of the present invention.

The imaging is provided by a sensor that provides image capture of a predetermined field of view by means of lens and a focal plane array (FPA), an actuation subsystem for moving the sensor by a step and dwell sequence, and an additional processing subsystem that is processor controlled for processing the captured image by analog/digital readout electronics, digital image processing electronics and a network interface. This processing subsystem manages the FPA, provides image stitching when needed (whereby images captured by the sensor during the step and dwell sequence are effectively stitched or mosaicked together) provides integration and readout of image data from the sensor, correction of images for gain and offset artifacts, subsequent buffering and combining of images into a single wide area image (which is sometimes a panorama) over the course of one motion sequence, or sequence of steps or moves, of the sensor and processing of images for object detection, tracking and localization, along with compression of images prior to storage and/or transmission within a network. These functions can be co-located or embedded near the FPA electronics or distributed across a network, e.g., with wide area image processing occurring remotely if necessary.

Wide area images formed by the invention are suitable for detection and tracking of objects and humans; the constituent images comprising the wide area can also be used individually for such detection and tracking, as befits the particular situation. This detection and tracking can be performed near the FPA elements or at a remote location via a network connection. Knowing the geometry of the system in relation to the environment, detection data products can be geodetically localized and time stamped for use in security and surveillance applications.

The actuation subsystem is comprised of an amplifier/ controller that closes a feedback loop around the controlled motor, or in the preferred embodiment, an output axis of the imaging system, this axis being e.g. a horizontal axis of rotation, but not limited to, and the axis being controlled for motion profiles. An encoder 104 is used to indicate the position of the device used to accomplish rotation with the attached servo motor. The servo motor is in turn driven by the output of the amplifier/controller 108.

Synchronization of the two subassemblies is derived from the FPA video control signals so that the timing of motion and readout functions can be precisely controlled. Timing is adjusted in advance or during operation so as to place image formation (integration) at points of zero or near zero motion. The preferred embodiment matches the FPA integration (and readout, if necessary) time to the maximum time of dwell so that maximum time is available for step motion; however, other considerations may produce a different timing scheme in order to be optimal for a particular installation site. Further, since the control of the system timing for motion and/or image capture is entirely electronic and under computer control, the image capture timing can be slaved to the motion timing, or vice versa.

FIG. 1 illustrates a system and method architecture for the invention with an imaging subsystem, a data management and control system, and a bearing/mechanism/interconnect 103 between the imaging system and the data management and control system. A typical sequence of interplay between the two subsystems is as follows: a) move sensor (e.g., sensor 100 in FIG. 1) to new position synchronously with video and control to minimum velocity, b) integrate image captured by sensor (done by the data management and control system), read out FPA pixel levels and digitize them (done by the data management and control system), c) form 2D image array with pixels, compensate image data for rotation, translation, position errors and image distortion, grayscale errors and compute the GPS coordinates of the relative N/E/S/W optical axes (centers), e) place pixel data in output (wide area) image (e.g., grid the data) and with interpolation as needed to accommodate overlap and holidays (done by the data management and control system), f) produce output wide area image (done by the data management and control system), g) process image or wide area constituent images locally or transmit image and related data products to a remote location for storage/processing. Motion to a new position can proceed once image integration, i.e., exposure, has completed, or when readout of the FPA pixel levels has completed, when typical uncooled microbolometers are used as sensors, as these use near-continuous exposure.

The system and method thus described according to FIG. 1 can, by virtue of its imagery, also accomplish the following incremental actions locally or remotely (e.g., a remote server): a) object detection within corrected and gridded wide area image data, b) object tracking between sequential wide area images, c) streaming of wide area image data as whole images or as subsets/sub-images selected by, for example, a virtual joystick, d) storing of detection and tracking data products locally or remotely for subsequent spatio-temporal data analysis, use detection and tracking information to direct laser illumination to humans being tracked so as to hail and warn.

In particular, FIG. 1 shows a moving/rotating subassembly (above dashed line) with at least one sensor 100 having an FPA and lens producing a predetermined field of view that captures an image of that field of view, a hailing device 101, e.g., a laser that can be used to signal to detected objects that they have been detected, ancillary sensors 109, e.g., inertial or temperature, such as are helpful for optimizing imaging and motion performance, and a controller 102 that manages the signals, power and interfaces generally to the electronics within the subassembly.

FIG. 1 further shows a middle subassembly 103 that furnishes the bearing surfaces (for rotation), its associated mechanism (if needed) and the electrical interconnection facility for signals and power. This bearing/mechanism/ interconnect 103 subassembly interfaces mounting points, power and data to a lower subassembly (beneath the dotted line). This lower subassembly contains a system controller 106 that enables communication and control of data products, operational settings or parameters, and system behavior generally. The system controller manages the motion profiles through a motor controller 108 and associated motor and encoder 104 elements, in the preferred embodiment (closed loop, servo motion control). The sensor data from imaging and ancillary devices are relayed or directly connected to a data processor 105. In the preferred embodiment, wide area generation and object detection are accomplished in this data processor 105; however, it is anticipated that the invention will in some cases only preprocess data at the data processor 105 and distribute the remaining processing tasks to devices available at another node of the network by way of the network interface 107.

In FIG. 1, the system controller 106 also makes use of ancillary sensor 110 data, e.g., inertial sensors for measuring the motion of the moving elements of the invention, such that motion control can be enhanced or image processing optimized by virtue of measuring residual or unintended motion. The system controller 106 thus manages the flow of data and monitors the system, serving as the primary communicator for the system, that communication taking place through a network interface 107 in the preferred embodiment. Is it anticipated that other interfaces of the system will be used when a network is not available or circumstances of location or use dictate a non networked configuration.

The actuation capability of the invention implied by the agility required for streaming panoramic images and the architecture of FIG. 1 enables several additional capabilities, namely: a) super resolution by virtue of forming a wide area image, or in some cases a panorama, of less than 360 degrees and using non integral pixel step sizes so as to capture images at inter-pixel locations, b) adaptive panorama generation wherein increased resolution is obtained in regions of higher priority, said priority being determined by the nature of detected objects, occlusions (e.g., due to a mounting structure), or by other cueing information provided by historical panorama data or other networked sensors in communication with the invention, c) higher rate wide field of view imagery wherein the motions normally employed to transit a horizontal motion sequence are used to move within a smaller region but delivering this smaller wide area image at higher data rate so, e.g., a 320×240 imager capable of 30 Hz video could be used to deliver 640×240 imagery at 15 Hz.

FIG. 2 illustrates an example packaging/configuration for the invention such as would be expected for implementing the architecture of FIG. 1. The upper housing package 200 houses the imaging optics, FPA, laser, ancillary sensors and associated electronics, while providing windows 201 that protect internal elements without impeding the transmission of light at sensor wavelengths. In the middle section 202 actuation, e.g., rotation, is powered using an integral servo motor and encoder, e.g., direct drive, in the preferred embodiment. Alternate actuation is compatible with the invention generally but may not provide the motion performance of a direct drive servo motor approach. The figure illustrates the use of convective cooling fins 203 as well, though these are not generally required for the invention to operate. Supporting electronics and ancillary sensors associated with the lower section of the invention can be included in implementations of the invention so as to measure and compensate for undesirable motion of the support structure, e.g., a pole, upon which the invention is mounted. These electronics/elements are shown as part of the inner profile of lower housing 204. In the preferred embodiment, the power and data are brought into the upper housing by a slip ring or equivalent device, though alternate approaches are envisioned, including those disclosed in U.S. application Ser. No. 12/436,687 pertaining to the transmission of power and data into a moving apparatus wirelessly, and that application is incorporated by reference herein. In the preferred embodiment, the upper housing attaches to the lower by a central column and associated bearing, and a central/concentric motor is used in conjunction with the amplifier/controller to rotate the upper housing.

Further, in FIG. 2 the lower housing 204 contains the amp/controller, the motor, encoder (preferably attached to the upper housing so as to monitor the actual load), the image digitizer/processor, any required ancillary sensors e.g., inertial sensors, GPS receiver (can be in same assembly), and also the power supply electronics, here shown packaged 205 for insertion into a pole structure inner diameter. Communications to and from the base can be managed by the main power/data connector on the side of the lower housing, though many communications configurations are compatible with the invention.

FIG. 3 shows an expanded view of the upper section of FIG. 2, illustrating a configuration having multiple sensors and a laser packaged within a single enclosure 300. Thus, for instance, a narrow field of view thermal sensor 305, a wide field of view thermal sensor 306, a wide field of view visible light sensor 301 and a visible, e.g., green, laser 303, can be used to simultaneously form wide area images at two resolutions in the thermal infrared waveband 305 306 while also imaging the same wide area with visible light 301 (assuming daytime or illuminated conditions), while responding to object detections, e.g., intruders, using the laser 303. For each waveband of light, suitable transparent windows 302 are used to allow visibility of the scene to be imaged while protecting optics and electronics needed to obtain the corresponding imagery, the signals and power for sensors and electronics being provisioned by a slip ring or equivalent sealed rotary pass through 307. The windows 302 are sealed to prevent ingress of moisture and/or dirt, and the lower flange 304 is likewise constructed such that an air tight seal can be accomplished, enabling a purge gas, e.g., nitrogen, to be used to enhance the resilience of the invention across diverse environmental conditions.

FIG. 3 thus shows sensors operating at two wavebands: thermal infrared (approximately 8000-12000 nanometers) and visible light (approximately 400-700 nanometers). The figure also illustrates the use of more than one field of view per wavelength; in the case of the thermal infrared both a narrow and wide are shown, corresponding to a higher and lower pixel density per imaging area, respectively. The diversity of wavelengths and fields of view is not limited by the invention, other than by constraints placed on the physical spaces allowed for sensors and the associated mechanisms required to sufficiently control the requisite motion. Thus, while FIG. 3 shows sensors stacked vertically and opposed horizontally (180 degrees separation between the visible and the thermal sensors, for instance), sensors could be distributed only horizontally, or only vertically, stacked more densely than shown, etc.

FIG. 4 shows an example installation of the components of FIG. 2 atop a pole for a remote surveillance application. In FIG. 4, the wide area imaging assembly 400 is mounted atop a pole such that the lower subassemblies (see FIG. 204) mount into the inner surface of the pole, where electrical connections and thermal mating surfaces, if needed, can be found. The pole structure 401 extends above ground level 403, and provides support for an enclosure 402 that can be used for site electrical junctions, battery backup, network and power monitoring, etc. The pole is anchored into the earth using reinforced concrete 404. The configuration of FIG. 4 is the preferred embodiment when infrastructure at remote locations is not sufficient to support the invention; however, diverse mounting configurations are anticipated for the invention, including mounting directly to buildings and also mounting on mobile/moving platforms, e.g., a fixed mount or telescoping mast installed in a vehicle.

FIG. 5 shows an example of the timing required to acquire images by sequentially stepping, dwelling and capturing image data; this figure shows plots of normalized position, velocity (dots) and image capture sync (on vertical axis) versus time 503 (horizontal axis). A low slope region for the position indicates the minimization of motion; this rotary position 501 is shown for a system such as that shown in FIG. 2. The low position slope or velocity 500 having low value 502 indicates a time for integration and image capture, as the FPA is stationary. The image capture sync signal 504 transitions 505 to an active state when the FPA is stationary such that the process of integrating, reading out and digitizing an image can begin. The high velocity periods 500 correspond to motion as can be seen in the position data. Using digital and analog electronics and computer control, the sensor motion and video acquisition process is controlled such that motion is synchronous with image acquisition timing. By synchronizing thus, images free of blur can be obtained at high rate, enabling a wide area image to be formed using video rate imagery and at sufficient frequency to support security and surveillance applications, e.g., human detection and tracking. Further, since the sensor motion and image capture are computer controlled and adaptable, arbitrarily long dwells can occur, such as intimated by the longer low motion state 504 in the figure. Similarly, the position pattern can be altered from a regular sequence to an arbitrary, including randomized pattern, all under computer control while operating and generating wide area imagery.

FIG. 6 shows an assembly of an FPA 602 with lens and associated package 600 and with its corresponding predetermined field of view 601. The FPA is shown exposed for the sake of clarity; however, these devices are typically not exposed but are packaged within sealed enclosures, including vacuum enclosures in the case of some uncooled thermal imaging FPAs.

FIG. 7 illustrates in simplified fashion how a wide area image can be generated with the invention; as such the figure shows the sensor assembly of FIG. 6 in the context of a wide area imaging motion pattern. In this simplified illustration, a sensor/lens assembly 702 is imaging with its predetermined field of view 701 in a rightward facing position, but once an image has been captured as this position, will advance 703 to a downward facing position 704, where a successive image will be captured. This process of motion and image capture at distinct positions is then repeated until the entire panorama 700, e.g., 360 degrees in this example, is traversed. In this example, a large gap occurs between the rightward and downward positions; this is typically not desired for a panorama made of adjacent constituent images, but is often the type of motion used for the more generate wide area imaging scenario where the priority of the imaged regions will determine the motion profile used and, thereby, the continuity of the constituent images comprising the wide area image.

As seen from the foregoing description, the system and method of the invention uses a motorized step/dwell/image capture, and when necessary, image stitch, approach to enable M×N focal plane arrays, M≥1, N≥1, to acquire images M'×N' having fields of view wider than the stationary imaging system (i.e. the sensor) can obtain, e.g., M'≥M, N'≥N. The system and method preferably uses inertial sensors, e.g., MEMS gyro/accelerometer device(s), to measure platform motion so as to stabilize the image to be produced using electro-mechanical means (e.g., adaptive step/dwell), image processing methods, or combinations thereof to compensate the output images for the observed inertial motion.

An example of wide area imaging that leads to a panorama will help to illustrate the invention. The example uses a 640×480 pixel uncooled micro bolometer sensor having a lens that provides a 35 degree horizontal field of view and a 26 degree vertical field of view. The average rate of rotation in the horizontal direction (so as to afford panoramic fields of view) is 360 degrees per second; thus, the wide area panoramic image generated once per second will be 26 degrees high and 360 degrees wide.

The difference between the invention and a typical panoramic imager that uses scanning is that the scan velocity, while having a constant mean value over one second intervals, is highly variable during the transit through 360 degrees in the horizontal direction. In fact, the velocity is periodic and can extend to beyond 360 degrees per second, depending on the details of the video timing and the format of the sensor. For this example, if we assume nearly instantaneous transitions from zero to full velocity, we can approximate the motion by a 50% duty cycle velocity profile having two states: 0 degrees per second and 720 degrees per second. Thus, the average velocity is 360 degrees per second as desired. This motion then is a start-stop-start-stop-etc. sequence (while the example is adequate for illustrating the principles, in practice the motion is more complicated, see FIG. 5, for example). The image data is collected during the "stop" portion so as to minimize blur; and the motion is accomplished during the "start" so as to change the field of view and over the course of 360 degrees rotation, accumulate the 640×480 images needed to make up a 360 degree panoramic view. If there is no overlap between adjacent images in the start-stop-start-stop sequence, then only 360/35=10+ images would be needed per second, each image comprising 35 degrees of the panorama. However, if overlap is to be used, which is the preferred embodiment when a 360 degree panorama is desired as the wide area image, then at least 11 images would be needed. For example, a 5% overlap (2.5% each side of each 640×480 image) would only require the 11 images per second (non integral frame rates not being allowed), but would provide some border regions intra-image to facilitate the image manipulations to accommodate spatial distortions, grayscale discontinuities at the edges, and automatic gain control effects—all of which need to be removed from the images being joined together to form the panoramic scene.

Thus, using a low cost micro bolometer and servo motor technology, a high speed, high quality, wide area digital imaging system can be obtained at low cost. This forms the basis for the invention, which is readily expanded to include image processing features, geodetic registration and many resultant temporal and spatial data services.

Encoding position states or information in imagery for offline or networked wide area image generation is contemplated for the invention. Since the information relating to the state of motion is readily available to the processor(s) that handles or compresses raw (pre panoramic) imagery, the position and motion state variables can be embedded into the images so as to remove the need for image processing in selecting images for wide area images. So, for example, the time and position corresponding to the image readout completion time, or an equivalent timing parameter, could be embedded in an image. This inclusion of information can be accommodated in, e.g., jpeg headers, or other metadata locations used for digital imagery.

Additional Features of the Invention

The scanning nature of the invention encourages the use of multiple-pass and sequential-pass algorithms for detecting and tracking, since there is little chance of detected objects ever actually exiting the field of view (flight and travel outside the resolution limits being some exceptions). For example, successive hypothesis test algorithms for detecting can be used to optimize the use of scanning resources for optimum resolution and resultant probability of detection. For instance, in order to maximize scan rate, it may be advisable to reduce the nominal panorama resolution or image frame rate while in a detection mode. In this case, if objects of potential interest are identified during the rapid scan mode, successive passes at increased resolution for finite regions of interest could be used to further test the hypothesis that "interesting" objects are there and merit further attention. Used in this fashion, the average and peak frame rates of the wide area imager can be traded against detection performance as a function of time, location, object priority, or location priority any of which may serve as proxies for an event or object of interest.

FIG. 1 implies a plurality of sensors and or other devices in the moving portion of the invention. Thus, wide area images at multiple wavelengths can be obtained at the same time, on an individual frame basis and/or on a wide area image basis; the former case corresponding to multiple sensors stacked vertically according to the example geometry of FIG. 3, the latter case corresponding to the opposing geometry (facing 180 degrees away from each other) of the visible wavelength and thermal wavelength sensors of FIG. 3, a geometry that can be extended in the invention to include arbitrary angular distributions of sensors of one or more wavelengths. FIG. 2 illustrates this by showing a system that uses two thermal infrared sensors, one visible light sensors and visible light laser. This can be further extended to include other wavebands and suggests the use of a ranging device such as a LIDAR (light detection and ranging) subsystem, or acoustic hailing devices as an alternate to a laser.

The invention is well suited to cueing itself, as suggested by successive hypothesis testing. However, it is also very useful for cueing other devices, e.g., nearby or adjacent high resolution pan/tilt/zoom cameras that can obtain continuous high rate high resolution video as track updates are provided by the invention, which is able to do so owing to its continuously updated wide area view of peripheral scenes.

The invention is also useful when simpler devices, e.g., motion detectors, seismic, or acoustic sensors, are used to indicate areas of unknown activity. In this scenario a successive hypothesis test scenario could be operated (or not, if simpler methods suffice) so as to maximize the wide area image update rate while still "keeping an eye on" areas that suggest ongoing activity, such as would be indicated with a simple motion detector placed near the periphery of the invention or in an adjacent occluded area, etc.

The hailing feature of the invention has been illustrated using a laser for visual communication of detection. An additional medium that can be used for audible communication of detection is hypersonic audio, wherein an audible signal is carried by a ultrasonic acoustic wave. Such a transmitter is anticipated to be used with the system and can be placed on the moving or stationary elements of the invention. In the former case, the transducers are integrated into the apparatus of FIG. 3 along with such additional electronics and/or actuation as are required to provide ultrasonic wave steering in the direction perpendicular to the plane of rotation of the wide area imaging sensor(s). For such a hypersonic hailing device, audible messages of a prerecorded nature could be transmitted and communicated to a detected object or person and/or a live human operator could generate audible messages by way of the network interface (107 see FIG. 1) and internal electronics used to convert those audio signals to hypersonic signals.

The use of a laser for hailing, in the preferred embodiment, uses modulation of the laser output (or conversely, modulation of the velocity and/or timing of the motion profile) to control the intensity of light as a function of range and also to shape the apparent (to the object/person) distribution of light in the direction of wide area image formation (horizontal, as shown in the example of FIGS. 2, 3). Further, the preferred embodiment uses structured light optics to constrain the geometry of the emitted laser light to, for instance, a vertical line that has an angular extent encompassing the vertical field of view for the invention. Other geometries are compatible with the invention and suitability of a geometry of structured light will vary as the wide area image orientation/application varies.

When a laser is used as the hailing device or is otherwise installed in the invention, and when a sensor capable of imaging the light from the laser (so both sensor and laser are in the same wave band) has the projected laser light within its field of view, e.g., the example of FIG. 3, the laser can also be used to illuminate objects being imaged with the laser when ambient light is not sufficient for an image, e.g., for a color sensor at night. In this case, the invention adjusts its motion pattern and image data collection scheme to suit the size of the imaged region and the structure of the projected laser illumination. For instance, if a vertical line is projected from the laser of FIG. 3, the invention motion pattern would restrict its motion to the area occupied by the object to be imaged and step/dwell past the object with the laser line, collecting and combining, e.g., shifting and stacking, successive image capture frames until the object is imaged in its entirety. By doing this at high speed the object will have moved very little and an image of the object will have been acquired, in spite of the lack of ambient light.

The invention is capable of adjusting its motion profile or pattern as a function of detections that occur within the field of view, e.g., the entire wide area, often 360 degrees. When multiple objects, e.g., intruders, are detected, the preferred embodiment will adapt the timing and dwell time within the wide area image region to minimize latency on objects of greatest interest, e.g., those closest to assets of high value and/or risk of loss, while maximizing the respective probability of detection for the detected objects of interest.

FIG. 2 shows that multiple fields of view corresponding to multiple sensors, e.g., FPA/lens assemblies, per invention are contemplated for the invention. In order to minimize the number of unique lens assemblies present, thereby reducing the number of components in the invention, it is anticipated that unconventional, e.g., anamorphic, lenses will be used for imaging sensor fields of view onto the sensor FPA. Such a lens will accomplish a mapping of pixels in the field of view onto the FPA such that the probability of detecting an object, e.g., human, is maximally flat as a function of distance from the invention. For example, if detecting a human requires at least 10 resolution elements, e.g., pixels, per major axis of the imaged human in order to be reliably detected, then the optimum unconventional lens would furnish at least 10 pixels of resolution at the maximum range and no more than 10 pixels of resolution at the minimum range. The image thus formed on the FPA would be highly distorted as compared to normal human vision; however, it would maximize the use of FPA pixels for detecting across the entire field of view such that maximum value is extracted for detecting objects of interest with the invention. Images thus generated could still be viewed by humans, but would be corrected for the nonstandard geometry prior to displaying, for a more intuitive view for a human operator of the invention.

In using the invention to hail an object or person, e.g., using a laser or acoustic means, the communication is from the invention to the object. However, it is anticipated that the invention will be used for communication from the object to the invention as well, either directly or by way of other nearby instances of the invention or comparable resources. That is, the invention is expected to be used to detect not only the presence of an object, but what its state is, e.g., its pose, orientation, or distribution. Thus the invention will detect gestures of predetermined nature so that the invention will classify the gesture, e.g., stationary human with arms extended 45 degrees to the ground could be assigned the meaning, "distressed", or arms extended horizontally may indicate a "friend" classification instead of "foe".

Classifying friend versus foe is further enabled by the invention through the use of wearable badges or patches that are resolved by the invention sensor(s) such that a unique individual or class identifier is detected and associated with an object or human. In the case of a thermal infrared sensor, the badge could contain, for example, a pattern of high and low emissivity surface coatings, i.e., a pattern of relative apparent physical temperature, that is imaged by a sensor and that functions equivalently to a bar code pattern used in electronic item identification. Such a thermal infrared compatible badge could, for example, be enabled using polycarbonate heat patch material, or other active thermally emissive materials. Other wavelengths and badge constructions are readily conceived and are contemplated for the invention.

The ability to measure the apparent physical temperature of objects imaged by a sensor in the invention is readily extended to measuring the actual physical temperature, such that temperature is quantified, e.g., degrees Celcius, by either calibrating sensors prior to installation, conducting a field calibration after installation of the invention, or using objects in the field of view to automatically discern and approximate the physical temperature, given ambient conditions. Such a sensor can measure the physical temperature of objects such that thermal abnormalities are detected, e.g., excessive heating or risk/presence of fire. The preferred embodiment is a sensor that has been calibrated prior to installation and which has calibration periodically updated.

The invention is further contemplated for use in asset management, whether as part of a security and surveillance application or not. In such a use of the invention, a catalogue of assets is generated by the invention in a sequence of steps: 1) generate a wide area image of the scene containing assets, 2) detect stationary objects, 3) classify stationary objects, 4) estimate sizes of stationary objects using image data and/or other sensor data, 5) (optionally) present objects to an operator for confirmation and valuation in priority or currency, e.g., dollars, or compute a value parameter for objects based on predetermined criteria, 6) store object information, including estimated size and location, e.g., GIS data, into a database that serves as a reference for future object comparison, e.g., displaced object detection/tracking for damage assessment, and/or to objectively determine the absence of an object in the case of theft or other movement of the object or an ensemble of objects of interest. The invention used in this way would then make use of its scan pattern to prioritize the invention operating parameters for motion and sensor data acquisition such that higher value assets are emphasized and more robustly protected than lower value assets.

Techniques for the foregoing asset tracking use of the invention are well known to those skilled in the art of computer vision technology. For instance the detection and classification of stationary objects is readily accomplished to a high degree of accuracy using imaged edge detection techniques such as the Canny method or the Berkeley natural boundary detector, in combination with Contour Segment Networks, to name only one approach to the problem of object detection. The preferred embodiment uses a visible wavelength sensor for the initial asset tracking task of object detection and classification and uses this to inform processing at other wavelengths, as the highest density of pixels and the presence of multiple colors can both be helpful. However, other wave bands can be used independently and, in some cases will yield superior results to that of the visible bands.

The estimation of size for the asset tracking use of the invention is applicable to more than just the problem of asset tracking as described. The estimation of size is helpful for detecting and tracking Consequently, the invention will be used to estimate the size of objects imaged with its sensors. The size can be estimated using a priori information and an estimate of the class of an object, such class being provided by one of the well-known supervised object classification algorithms. However, the error rate of an object class based size estimate, e.g., if object is a house, then an average house size is used, is likely to be unsatisfactory for some applications. The invention enables a more robust estimate of object size by making use of stereo imaging techniques and the known geometry of sensors and optics used in the invention. The finite field of view of the invention sensor(s), combined with the presence of physical separation between optical axes, enables an object to be imaged with a sensor in the invention at two different locations of the sensor, these locations having a finite distance between them perpendicular to the line between the FPA and the object. This finite distance along a perpendicular, or baseline, exists in two forms in the invention as shown in FIG. 3. A baseline between the two thermal sensors 305 306 exists in the vertical direction; a baseline also exists for any sensor 301 305 306 with itself between two angular positions, e.g., 0 to 360 degrees. These baselines, when combined with images of the same object captured by sensor data from the two ends of the baseline, enable a stereo image estimate of range to be made for features and/or objects imaged by the sensor. The techniques for doing so with imagery are well known to those skilled in the art of computer vision and are readily available at public repositories, e.g., OpenCV or equivalent.

A related facility for the invention to that of asset tracking is that of automatically estimating areas in a panorama that are of little interest, such that the automated detection of objects is not susceptible to clutter from those regions, and so that, to the extent possible, those regions are de-emphasized in the estimating of optimal scan patterns for the motion profile used within the invention to produce a wide area image. Predetermined or inferred criteria for assessing the level of interest can be used, and interest can also be determined adaptively, e.g., by observing the frequency of events of interest such as vehicle traffic and/or by observing the presence or absence of object features and/or by using known landscape features to classify imaged regions, such as sky (blue). The computer vision application area addressed by this invention feature is that of gist recognition and is well known to those skilled in the art of computer vision.

When the invention is used in conjunction with other surveillance systems, including other instances of the invention, it is helpful to those responsible for the surveillance to be able to seamlessly detect and track objects from one system to the other. Thus the invention contemplates the handing off of a detected object from one system to another by virtue of sharing the location, e.g., GPS coordinates, and nature, e.g., sensor data characteristics in image or other more compact form, between successive systems viewing the object as it moves out of the viewing range of one and into the viewing range of another.

The sensors illustrated in FIG. 3 are optical in nature. However, longer wavelengths, such as those employed in radio frequency (RF, including microwave and similar order of magnitude wavelengths), can be accommodated as sensors in the wide area image generation as well. The simplest implementation of such an RF panorama sensor would be to use a commercial radar module having a beam that radiates the same region as that of the optical assemblies of FIG. 3, i.e., having the same or similar field of view, and sample the radar at the same time as a sensor, or continuously, provided the radar pulse repetition frequency (PRF) is sufficiently high and the ambiguous range is outside the region of interest, for example. In this case a panorama having at least a single pixel, but not more than the number of range bins, in the vertical direction would result, and having pixels in the panorama direction of at least the number of stationary locations (see FIG. 4) but not exceeding the product of the PRF and the time per panorama sweep (360 degrees in the case of a complete 360 degree panorama). A more robust, as concerns antenna side lobes and related detection clutter for the RF implementation in the invention would use an array, e.g., conformal and integrated into the invention upper housing (200, FIG. 2), having elements distributed both vertically and horizontally such that resolution in the vertical and horizontal dimensions is achieved and antenna gain in each dimension enables lowering of side lobes and improvement of directivity. Further, if the elements are implemented with phase controls, a phased array steering of the central lobe of the resultant antenna pattern can be accomplished to further control and enhance the directivity. Finally, using the motion profile needed for wide area image generation, an RF sensor, e.g., coherent radar, a synthetic aperture radar (SAR) implementation could be integrated into the geometry/package of FIG. 2 such that RF wavelength sensor are available as wide area images instead of, or in conjunction with, shorter wavelength, e.g., optical wavelengths less than 20000 nanometers, sensor data as described above.

Sensors are also contemplated for use with the invention that are integrated along side of the invention or, in some sense, in close proximity. Examples of this are scanning radars having fixed/mounted arrays, e.g., mounted to the pole beneath the invention shown in 401 FIG. 4, and hypersonic/acoustic devices or arrays that can be electrically or mechanically directed to objects of interest that are detected by the invention.

The system and method of the invention enable sensor scans of a predetermined field of view, at different angles, by a step/dwell/image capture sequence under processor controlled servo motor that provides coverage of a wide field of regard with an inexpensive sensor (e.g. uncooled microbolometer). The system and method utilizes a relatively small number of pixels at a relatively low net frame rate (e.g., maximal thermal infrared pixels and image capture rate for a field of regard, at low system and operating cost (vs lots of FPAs or cooled cameras)

The imaging system and method utilize a) an image sensor with a known/particular field of view, attached to b) a motion control platform, such that the image sensor can be moved automatically to cover a wider "field of regard" than the (immediate/nominal/optical) field of view of the sensor, with the motion controlled to step through a sequence of 2 or more positions quickly and then dwell in each position only long enough to take a still image, repeating the sequence (or a computed variation of the sequence) continually, preferably under the control of a servo drive, or more specifically direct drive.

The system and method can utilize a plurality of sensors, each potentially of different spectrum or FOV. The sensors can be sensors with variable fields of view (FOV), e.g., zoom optics, with the data management and control system choosing an FOV based on predetermined or dynamic strategy. The system and method can be implemented on a moving platform as well, and can provide for stitching images together to produce single composite or panoramic images of up to 360 degrees coverage.

The system and method of the present invention enables automatic object or motion detection against individual images, wide area images or panoramas, provides variable step and dwell sequences, step and dwell synchronized to camera capture, sensor fields of regard may or may not be contiguous, and may or may not be 360 degrees. The system and method provides "motion and/or object detection", and utilizes a servo drive, as opposed, e.g., to a mechanical indexing scheme. A preferred embodiment would use a direct drive motor.

The system and method of the present invention provides an automatic imaging system, with a step and dwell sequence for the sensor, and covers a wider field of regard than the field of view of the sensor (FPA and lens), and utilizes time and synchronization to get wide coverage and repetition in short time (e.g. real time). The data management and control system is autonomous; it chooses/changes its priority of where and how long to look and with what dynamically, so that, knowing the necessary integration time, dwell time can be varied accordingly, and imaging can be concentrated on a particular region of interest. Image stitching may be useful in some situations, but is not a requirement. The sensor platform, in its preferred embodiment, has one moving (bearing) part, so that there is relatively little wear or associated service, and the system and method enables changing the step and dwell steps and image capture, on the fly under software control.

Thus, as seen from the foregoing description, according to the present invention, wide area imaging is provided by a step/dwell/image capture process/system to capture images and produce from the captured images a wide area image as maximal speed (minimum time per wide area image). The image capture is by a sensor that has a predetermined image field and provides image capture at a predetermined frame capture rate, and by a processor controlled motorized step and dwell sequence of the sensor, where image capture is during a dwell, and the step and dwell sequence of the sensor is synchronized with the image capture rate of the sensor. In a preferred form of the system and method of the present invention, the step/dwell/image capture sequence is under processor control that is interfaced to a servo motor to selectively control the sensor position in a manner that is related to the step/dwell/image capture sequence.

Detection products can be derived from either a wide area image or the individual image frames used to form the panorama. The advantage of using an individual image frame, e.g., a single 640×480 in the example cited above, is that there is no loss of information due to overlap and the signal processing gain corresponding to multiple observations of an event is available in an obvious way (often this will accumulate as the square root of the number of observations). In the preferred embodiment, image processing occurs in both individual image frames and in wide area (which can included stitched) imagery when image overlap exists between individual frames, such that partial images (caused by the bisection of an object with a single frame boundary) and multiple observances can be accommodated without loss of performance.

In a preferred aspect of the present invention, the sensor is located on a moveable platform, and movements of the platform that affect the wide area image produced from the captured image are measured and used to provide image compensation that is related to such movements of the platform. Moreover, when a subject, e.g. a human, is identified in the wide area image, the subject can be hailed or notified that its presence has been detected.

The preferred wide area imaging system and method can also have one or more of the following features; (a) the wide area imaging system and method may include a processor that uses object detection on a captured image or the wide area image to extract and localize objects of interest in the wide area image; (b) the wide area system and method may be configured to provide variable step and dwell sequences of the sensor, to produce the wide area image; (c) The wide area system and method may be configured to provide variable step and dwell sequences of the sensor, to enable the sensor to localize the sensor on selected image fields; thus, if the system is being manually or automatically monitored, and the monitor observes an object of particular interest, the sensor can be localized on that object; (d) the wide area system and method can have (or be controlled by) a processor configured to use successive hypothesis testing of detected objects in the wide area image to determine the step and dwell sequences of the sensor; (e) in the wide area system and method the sensor can be configured to produce image capture in a manner that is useful in producing high density imagery in the wide area image; (f) the wide area imaging system and method can be coupled to a control center via an interface and configured to allow the control center access to subsets of the captured images (including stitched subsets), via the interface; (g) the wide area imaging system and method can have a sensor configured with one of the following sensing techniques: infrared, visible or other wavelengths to form an image using sensor pixels, including the collection of multiple wavelength images at the same time (multiple FPAs); (h) the step/dwell/image capture sequence can be configured to synchronize the initiation of image capture by the sensor to a position to which the sensor is selectively moved under servo motor control; and (i) the step/dwell/image capture sequence can be configured to synchronize movement of the sensor to a selected position to the timing with which the sensor is controlled to initiate image capture.

The principles of the present invention have been described herein in connection with one exemplary system and method, and from that description the manner in which the principles of the present invention can be applied to various types of wide area imaging systems and methods will be apparent to those in the art.

What is claimed is:

1. A wide area imaging system for performing surveillance of an area, the system comprising:
   a sensor that uses a rotational step/dwell/image capture sequence to capture images of the area under surveillance, the sensor providing image capture of a predetermined image field; and
   a processor that controls the step/dwell/image capture sequence to synchronize motion in a direction of rotation of the system with image capture, wherein the predetermined image field advances in the direction of rotation as the system rotates, and wherein the captured images are used to produce a wide-area image of the area under surveillance, the processor being configured to operate in a first mode and a second mode,
   in the first mode, the processor controlling the sensor to capture a first set of images of the area under surveillance, the first set of images being used to produce a first wide-area image of the area under surveillance, the first wide-area image having a first resolution, and
   in the second mode, the processor controlling the sensor to capture a subsequent second set of images of the area under surveillance, the second set of images being used to produce a subsequent second wide-area image of the area under surveillance, at least a portion of the second wide-area image having a second resolution that is higher than the first resolution,
   wherein the processor is configured to operate in the second mode in response to detection, by the processor, of one or more objects of interest in the first wide-area image, and
   wherein the system is configured to store image data produced from the step/dwell/image capture sequence, and to use the stored image data as a reference for comparison with image data produced from a subsequent step/dwell/image capture sequence.

2. The wide area imaging system of claim 1, wherein the first wide-area image covers a larger region of the area under surveillance than the second wide-area image.

3. The wide area imaging system of claim 1, wherein the sensor is configured to measure a physical temperature of one or more objects in the area under surveillance.

4. The wide area imaging system of claim 3, wherein the processor is configured to utilize the measured physical temperature from the sensor to determine the presence of fire in the area under surveillance.

5. The wide area imaging system of claim 1, wherein the processor is configured to detect thermal abnormalities in the area under surveillance.

6. The wide area imaging system of claim 1, wherein the sensor is located on a moveable platform, and one or more inertial devices measure movements of the platform that affect the wide-area image produced from the captured images and produce output that can be used to provide image compensation that is related to such movements of the platform.

7. The wide area imaging system of claim 1, wherein the processor uses object detection on the wide-area image or the captured images to extract and localize objects of interest in the wide-area image.

8. The wide area imaging system of claim 1, wherein the processor is configured to use successive hypothesis testing of detected objects in the wide-area image to determine the step and dwell sequences of the sensor.

9. The wide area imaging system of claim 1, wherein the processor uses object tracking on the wide-area image or the captured images to record the behavior of one or more objects of interest in one or more wide-area images.

10. A wide area imaging method for performing surveillance of an area, the method comprising:
operating a sensor that uses a rotational step/dwell/image capture sequence to capture images of the area under surveillance, the sensor providing image capture of a predetermined image field;
controlling, by a processor, the step/dwell/image capture sequence to synchronize motion in a direction of rotation of the system with image capture, wherein the predetermined image field advances in the direction of rotation as the system rotates;
using the captured images to produce a wide-area image of the area under surveillance;
operating the processor in a first mode, wherein the processor controls the sensor to capture a first set of images of the area under surveillance, the first set of images being used to produce a first wide-area image of the area under surveillance, the first wide-area image having a first resolution;
operating the processor in a second mode, in response to detection, by the processor, of one or more objects of interest in the first wide-area image, wherein in the second mode the processor controls the sensor to capture a subsequent second set of images of the area under surveillance, the second set of images being used to produce a subsequent second wide-area image of the area under surveillance, at least a portion of the second wide-area image having a second resolution that is higher than the first resolution;
storing image data produced from the step/dwell/image capture sequence; and
using the stored image data as a reference for comparison with image data produced from a subsequent step/dwell/image capture sequence.

11. The wide area imaging method of claim 10, wherein the first wide-area image covers a larger region of the area under surveillance than the second wide-area image.

12. The wide area imaging method of claim 10, further comprising measuring, by the sensor, a physical temperature of one or more objects in the area under surveillance.

13. The wide area imaging method of claim 12, further comprising determining, by the processor utilizing the measured physical temperature from the sensor, the presence of fire in the area under surveillance.

14. The wide area imaging method of claim 10, further comprising detecting, by the processor, thermal abnormalities in the area under surveillance.

15. The wide area imaging method of claim 10, further comprising extracting and localizing, by the processor using object detection on the wide-area image or the captured images, objects of interest in the wide-area image.

16. The wide area imaging method of claim 10, further comprising determining, by the processor using successive hypothesis testing of detected objects in the wide-area image, the step and dwell sequences of the sensor.

17. The wide area imaging method of claim 10, further comprising recording, by the processor using object tracking on the wide-area image or the captured images, the behavior of one or more objects of interest in one or more wide-area images.

* * * * *